United States Patent
Boles, Jr. et al.

(10) Patent No.: US 6,752,390 B1
(45) Date of Patent: Jun. 22, 2004

(54) STABILIZER TOOL FOR FIBER OPTIC CABLE

(75) Inventors: Walter F. Boles, Jr., Snellville, GA (US); Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 127 days.

(21) Appl. No.: 10/217,869

(22) Filed: Aug. 13, 2002

(51) Int. Cl.[7] .................................................. B25B 5/08
(52) U.S. Cl. ............................. 269/235; 269/3; 269/6; 269/903
(58) Field of Search ................................. 269/235, 196, 269/6, 903, 229, 95, 3; 254/218, 221; 29/281.1

(56) References Cited

U.S. PATENT DOCUMENTS

| | | | | |
|---|---|---|---|---|
| 4,103,871 A | | 8/1978 | Patterson, III et al. | |
| 4,623,156 A | * | 11/1986 | Moisson et al. | 279/106 |
| 4,775,121 A | * | 10/1988 | Carty | 248/68.1 |
| 5,257,763 A | * | 11/1993 | Nakamura | 248/56 |
| 5,437,000 A | * | 7/1995 | Dyott | 385/137 |
| 5,640,876 A | | 6/1997 | Erwin | |
| 6,003,851 A | * | 12/1999 | Araki et al. | 269/239 |
| 6,003,852 A | * | 12/1999 | Kawamura | 269/287 |
| 6,076,805 A | | 6/2000 | Messersmith | |
| 6,296,240 B1 | * | 10/2001 | Nakai et al. | 269/47 |

* cited by examiner

*Primary Examiner*—Lee D. Wilson

(57) ABSTRACT

A tool for stabilizing slack fiber cable that has been withdrawn from a cable duct includes an inner sleeve portion for stabilizing the end portion of the cable remaining in the duct and a collar that is coupled to the sleeve and attaches to the exterior periphery of the duct. A set of cable-locking rollers is coupled to the collar and used to engage the slack portion of the cable and hold it in place as various fibers within the cable are repaired.

9 Claims, 2 Drawing Sheets

STABILIZER TOOL FOR FIBER OPTIC CABLE

TECHNICAL FIELD

The present invention relates to a tool to stabilize a section of fiber optic cable and, more particularly, to a tool to stabilize a section of slack fiber cable exposed at an end of a duct as repairs or splicing operations are performed on the exposed cable.

BACKGROUND OF THE INVENTION

Current communication networks include thousands of miles of fiber optic cable, where each cable may include as few as 24 or as many as 800 separate optical fibers. At times, these cables can be damaged or cut through, such as during excavations at the cable site. Lightning strikes and other environmental-related conditions have also been found to damage cables. It often becomes necessary, therefore, to expose damaged sections of cable and repair the damaged fibers as quickly as possible. Sometimes the damage is severe and all of the fibers in the cable are damaged, and yet at other times only a few of the fibers are damaged. When all of the fibers are damaged, restoration is quite simple—the damaged section is located and the fibers are spliced back together. However, when only a few of the fibers are damaged, only these fibers need to be spliced back together, requiring the non-damaged fibers to be protected during the repair process. In most cases, the damage location will be spanned with a restoration cable during the repair process, requiring the cable to stabilized to avoid further damage.

To gain access to a fiber cable in the damaged area, the cable duct system must be exposed and cut open to reveal the cable. After the duct is uncovered and the cable is exposed, the cable sheath is removed from around the cable to allow for access to the individual fibers. During this process, access to the fibers is gained by placing wire mesh grips around the fiber cable and a come-along device is used to place tension on the cable so as to prevent the cable from being pulled into two pieces while the splicing operation is being performed. This process has been found to be quite cumbersome, with the grips and the come-along device cluttering the work area in the splice location.

Thus, a need remains in the prior art for a device that provides a stabilized work area during a fiber splice, while also protecting the fiber cable during the restoration process.

SUMMARY OF THE INVENTION

The need remaining in the prior art is addressed by the present invention, which relates to a tool to stabilize a section of fiber optic cable and, more particularly, to a tool to stabilize a section of slack fiber cable exposed at an end of a duct as repairs or splicing operations are performed on the exposed cable.

The cable stabilization device of the present invention comprises a split housing component that fits over the end of the duct and includes setscrews to secure the housing to the duct. A pair of roller wheels are disposed at one end of the housing and are used to grip the fiber cable exiting the duct and hold the cable in place during the restoration process. In one embodiment, a ratcheting mechanism is used is lock the wheels into the cable. The cable stabilization device further comprises a split inner sleeve, attached to the housing, where the sleeve extends into the duct to support an end portion of the fiber cable during the restoration process.

In a preferred embodiment, the housing and sleeve comprise a relatively strong plastic material, such as polyethylene, that will be able to support both the duct and cable components during the restoration process.

Other and further embodiments of the present invention will become apparent during the course of the following discussion and by reference to the accompanying drawings.

BRIEF DESCRIPTION OF THE DRAWINGS

Referring now to the drawings, where like numerals represent like piece parts in several views.

DETAILED DESCRIPTION

Figure 1:
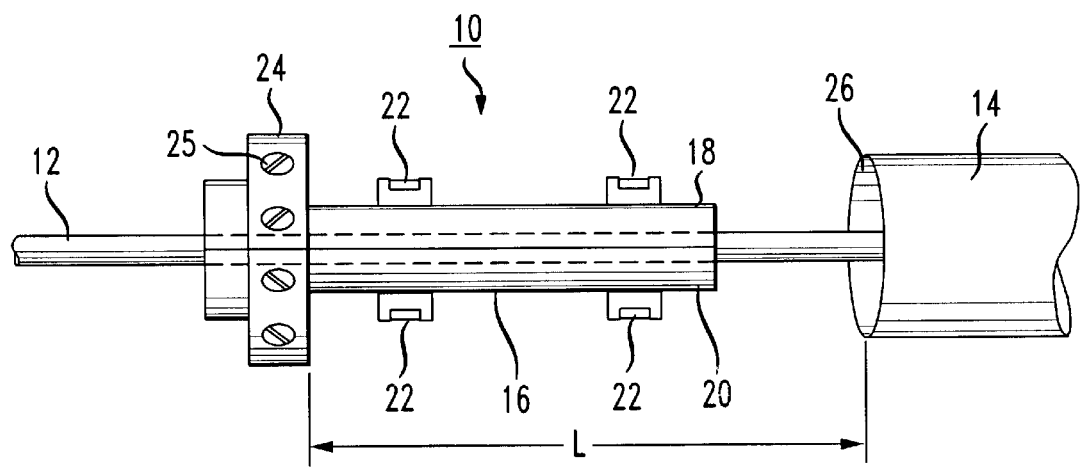
FIG. 1 is a top view of an exemplary cable stabilization device of the present invention, as it is first attached to an exposed section of fiber cable.

FIG. 1 contains a top view of an exemplary cable stabilizer tool 10 of the present invention. In this particular view, a section of fiber cable 12 that needs to be repaired has been exposed beyond a cut-away portion of an exemplary cable duct 14. In most circumstances, duct 14 comprises a hard plastic material of $1/8$"–$3/8$" thickness, with a diameter ranging from about a half inch to one-and-a-half inches. Due to the thickness of the actual cable, it is usually a fairly tight fit of the cable within the duct and there is a need to stabilize the structure during the repair operation. Once a section of duct 14 has been cut away, the cable is slowly pulled out (usually from both sides of where the section of duct 14 has been removed). Since there is not much slack cable available along a conventional cable run, there will be a tension induced on the cable as it is pulled that will by its nature draw the cable back into the duct. The stabilization device of the present invention is used to prevent the cable from re-entering the duct until the repair is completed.

Referring to FIG. 1, cable stabilizer tool 10 includes an inner sleeve portion 16 that fits around and locks onto cable 12. In a preferred embodiment, inner sleeve portion 16 includes a top U-shaped member 18 and lower U-shaped member 20 (see FIG. 3) that surround an end portion of cable 12. Inner sleeve portion 16 is chosen to have a length L sufficient to stabilize cable 12 during the repair process and preferably comprises a plastic material such as polyethylene. In one exemplary embodiment, a set of locking tabs 22 are used to secure inner sleeve portion 16 to cable 12.

Figure 2:
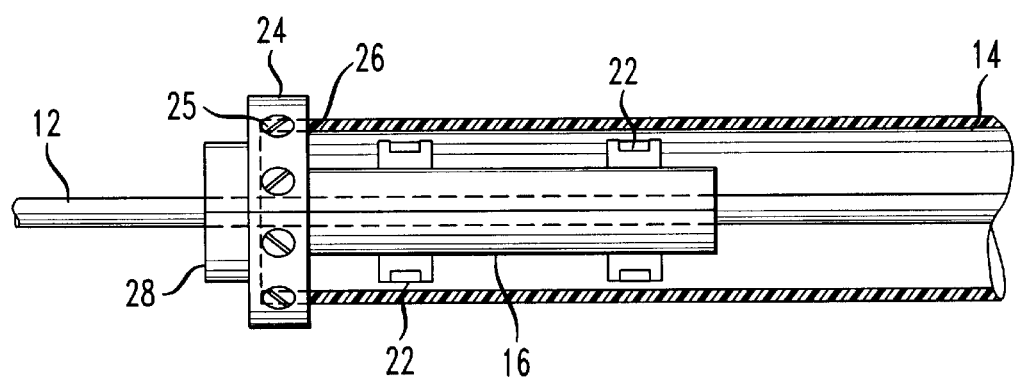
FIG. 2 is a top view of the device of FIG. 1, as it is attached in place surrounding a cut-away section of cable duct.

Once inner sleeve 16 has been secured to cable 12, sleeve 16 is inserted into duct 14 and a collar portion 24 of stabilizer tool 10 is attached to the cut-away outside perimeter 26 of duct 14, where collar portion 24 preferably comprises a relatively stiff plastic material, such as polyethylene. FIG. 2 illustrates this arrangement of tool 10, where a plurality of screws 25 are used to attach collar portion 24 to outer perimeter 26 of duct 14. By using screws 25 to secure collar portion 24 to duct 14, the same collar may be used with ducts of different diameters, merely by adjusting screws 25 during attachment. To further stabilize the section of cable 12 that has been exposed for repair, a set of locking rollers 28 is used to tighten down on the slack portion of cable 12 in the work area.

Figure 3:
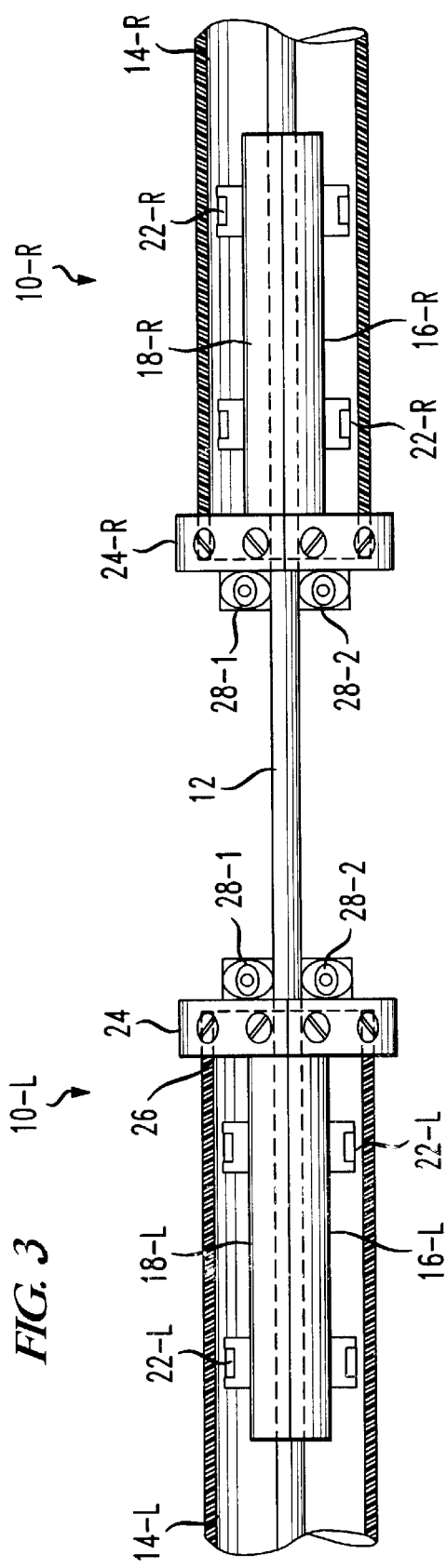
FIG. 3 is a side view of a pair of stabilization devices of the present invention, as used to stabilize a portion of slack fiber optic cable during repair procedures.

FIG. 3 illustrates a side view of an arrangement of a pair of stabilizer tools 10-R and 10-L, tool 10-R disposed around the right-hand cut-away portion of duct 14-R and tool 10-L disposed around the left-hand cut-away portion of duct 14-L. Clearly evident in this view is the set of locking rollers 28 (specifically designated as 28-1 and 28-2) used to clamp the slack portion of cable 12 between stabilizer tools 10-L and 10-R. In a preferred embodiment, rollers 28 comprise a set of grooved wheels that easily lodge against the cables and hold them in place. In particular, a ratchet-tightening arrangement can be used to lock-down rollers 28 on cable 12 to prevent any of the slack cable from re-entering duct 14.

Once the work is completed, a "one click" on the ratchet can be used to release the grip on rollers 28. Collar portion 24 can then be unscrewed from end 26 of duct 14, and inner sleeve 16 removed.

While specific embodiments of the present invention are herein shown and described, it is to be understood that variations therein are possible within the spirit and scope of the following claims.

What is claimed is:

1. A tool for stabilizing a section of fiber optic cable withdrawn from a cable duct, said tool comprising an inner sleeve portion of length L for surrounding and extending along a predetermined portion of cable;

a collar portion coupled on a first side to one end of said inner sleeve, said collar portion for encircling and attaching to the periphery of a cut-away section of cable duct; and cable-locking rollers attached to a second, opposite side of said collar portion, said cable-locking rollers for gripping onto the section of fiber optic cable withdrawn from said cable duct.

2. A tool as defined in claim 1 wherein the inner sleeve comprises a pair of U-shaped longitudinal sections for encircling the predetermined portion of cable to be surrounded.

3. A tool as defined in claim 2 wherein the pair of U-shaped longitudinal sections includes a set of locking tabs for securing the inner sleeve onto the predetermined portion of cable to be surrounded.

4. A tool as defined in claim 1 wherein the inner sleeve comprises a polyethylene material.

5. A tool as defined in claim 1 wherein the collar portion includes a plurality of attachment screws for attaching said collar portion to the exterior surface of the cable duct.

6. A tool as defined in claim 1 wherein the collar portion comprises a polyethylene material.

7. A tool as defined in claim 1 wherein the cable-locking rollers comprise a pair of rollers, a first roller disposed above the section of fiber optic cable withdrawn from said cable duct and a second roller disposed below said withdrawn fiber optic cable.

8. A tool as defined in claim 1 wherein the cable-locking rollers comprise a pair of grooved wheels for locking onto the section of fiber optic cable withdrawn from said cable duct, said withdrawn fiber optic cable fitting into the grooved portion of each wheel.

9. A tool as defined in claim 1 wherein the cable-locking rollers tighten onto the section of fiber optic cable withdrawn from the cable duct using a ratchet mechanism.

* * * * *